(12) United States Patent
Onome et al.

(10) Patent No.: US 8,145,419 B2
(45) Date of Patent: Mar. 27, 2012

(54) MOBILE OBJECT POSITION ESTIMATION APPARATUS AND METHOD

(75) Inventors: Hirohisa Onome, Toyota (JP);
Kazunori Kagawa, Toyota (JP);
Yasuhiro Tajima, Toyota (JP); Iwao Maeda, Nagoya (JP); Kiyomi Nagamiya, Nishikamo-gun (JP);
Akihiro Ueda, Toyota (JP)

(73) Assignee: Toyota Jidosha Kabushiki Kaisha, Toyota-shi (TW)

( * ) Notice: Subject to any disclaimer, the term of this patent is extended or adjusted under 35 U.S.C. 154(b) by 1001 days.

(21) Appl. No.: 12/092,088

(22) PCT Filed: Nov. 17, 2006

(86) PCT No.: PCT/IB2006/003309
§ 371 (c)(1),
(2), (4) Date: Apr. 30, 2008

(87) PCT Pub. No.: WO2007/057771
PCT Pub. Date: May 24, 2007

(65) Prior Publication Data
US 2008/0262730 A1    Oct. 23, 2008

(30) Foreign Application Priority Data

Nov. 18, 2005  (JP) .................................. 2005-334395

(51) Int. Cl.
*G01C 21/00*    (2006.01)
(52) U.S. Cl. ..................................... 701/220
(58) Field of Classification Search .................. 701/220, 701/301
See application file for complete search history.

(56) References Cited

U.S. PATENT DOCUMENTS

| 5,902,349 A | 5/1999 | Endo et al. |
| 5,956,250 A * | 9/1999 | Gudat et al. ................... 701/26 |
| 6,108,603 A | 8/2000 | Karunanidhi |
| 6,154,152 A * | 11/2000 | Ito ................................. 340/988 |
| 7,496,447 B2 * | 2/2009 | Tanaka ........................ 701/208 |
| 2003/0158799 A1 * | 8/2003 | Kakihara et al. ............... 705/30 |
| 2005/0102098 A1 * | 5/2005 | Montealegre et al. ........ 701/209 |
| 2006/0047420 A1 * | 3/2006 | Tanaka ........................ 701/208 |

FOREIGN PATENT DOCUMENTS

| CN | 1530635 A | 9/2004 |
| EP | 1 096 230 | 5/2001 |
| JP | 9 189564 | 7/1997 |
| JP | 10 170289 | 6/1998 |

* cited by examiner

*Primary Examiner* — Amee A Shah
(74) *Attorney, Agent, or Firm* — Oblon, Spivak, McClelland, Maier & Neustadt, L.L.P.

(57) ABSTRACT

A mobile object position estimation apparatus mounted in a mobile object includes a first estimation mechanism for estimating the mobile object position based on the outputs from an inertial navigation sensor device (acceleration sensor, and yaw rate sensor, or the like) mounted on the mobile object, a storage for storing map information including at least node information, a second estimation mechanism for estimating the mobile object position based on a predicted path of traveling of the mobile object predicted from the node information, and a synthesis mechanism for determining the final estimated mobile object position by synthesizing the mobile object position estimated by the first estimation mechanism and the mobile object position estimated by the second estimation mechanism.

13 Claims, 6 Drawing Sheets

PRIOR ART

PRIOR ART

MOBILE OBJECT POSITION ESTIMATION APPARATUS AND METHOD

BACKGROUND OF THE INVENTION

1. Field of the Invention

The present invention relates to a mobile object position estimation apparatus mounted aboard a mobile object and estimation method. Specifically, it relates to a mobile object position estimation apparatus for estimating the position of a mobile object with high precision, free from the influence of the road contour and the surrounding environment.

2. Description of Related Art

A conventional mobile object position estimation apparatus is described in Japanese Patent Application Publication 9-189564 (JP 9-189564A). The mobile object position estimation apparatus is mounted in a vehicle for example and estimates the position of the mobile object. This type of apparatus is typically included within a navigation system.

Typically, a Global Positioning System (GPS) is used for detecting and estimating the position of a mobile object so as to acquire the absolute coordinates of the mobile object.

To accommodate situations in which the condition of reception of the radio signal from the GPS satellite is poor, a group of inertial navigation sensors, such as acceleration and yaw rate sensors, are provided so that the position of the mobile object can be estimated based on the outputs from the group of inertial navigation sensors.

In most conventional GPS, the measurement accuracy is poorer than that of real-time kinematic GPS (RTK-GPS), and an error of approximately several tens of meters can occur. The accuracy of the inertial navigation sensor devices characteristically worsens with so-called drift as time elapses.

Given this situation, if the detected and estimated position of the mobile object in a navigation system is discovered to be off a road when a check is made against map information previously held by the mobile object, so-called map matching processing (hereinafter "map matching") is performed so as to correct the position of the mobile object to bring the mobile object to some position on the road before indicating the position to the user.

In JP 9-189564A, an apparatus that corrects the inertial navigation sensor devices error and output error based on map information when the position and the speed of the mobile object are calculated using the inertial navigation sensors because of a failure to receive the GPS signal is described.

However, both map matching and the correction processing using map information described in JP 9-189564A assume that the map information is accurate, and constitute processing that brings the accuracy of the detected and estimated mobile object position in line with the accuracy of the map information. The accuracy of the mobile object position after correction, therefore, does not exceed the accuracy of the map information.

Map information generally consists of a plurality of nodes and straight line links connected between the nodes. The map matching process corrects the offset in the detected and estimated mobile object position to coincide with some position on a link when the mobile object position results is not positioned over a link.

Because the capacity of the memory media used to store map information is finite, however, rather than storing as map information of all the points of inflection of the road contour at which nodes should be set, there is some "skipping" of nodes. Thus, the road contour described by the nodes and links included in the map information is not necessarily a complete representation of the actual road contour.

In the map matching and in the correction process described in JP 9-189564A, which use map information (node and link information) the accuracy of which is not necessarily good as correct information serving as a benchmark, even after correction the mobile object position could still have a relatively large error. Additional inaccuracy may be introduced into the detected and estimated position of the mobile object by map matching and other interpolation processes or the like.

Figure 1A:
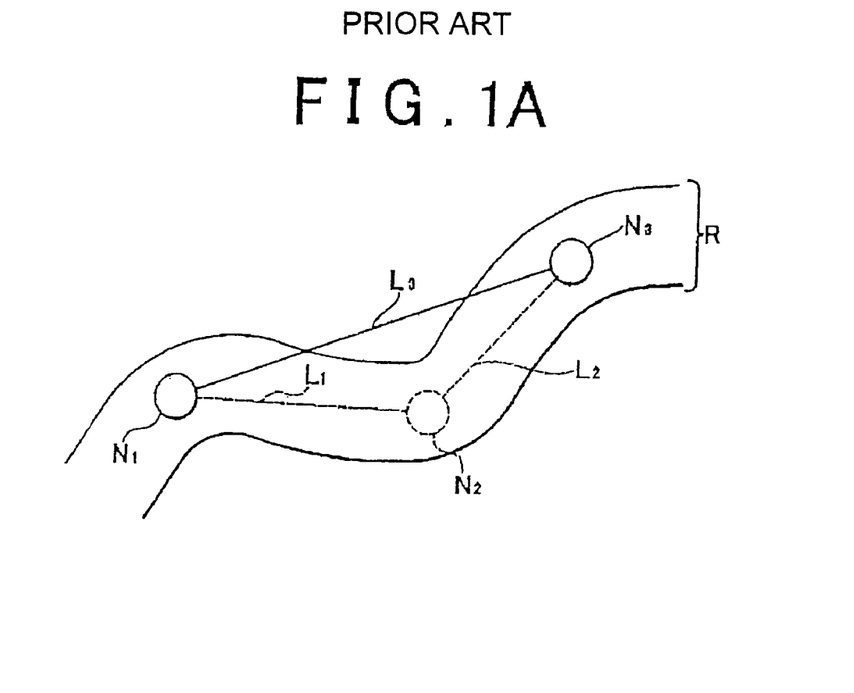
FIG. 1A and FIG. 1B are drawings for explaining the problems with map matching in the related art.
Figure 1B:
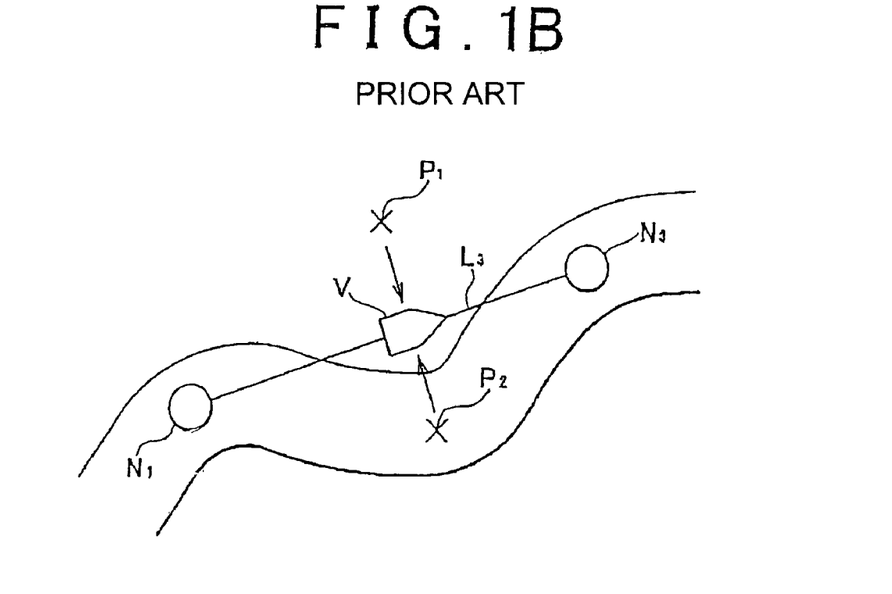

An example is shown in FIG. 1A and FIG. 1B. As shown in FIG. 1A, node $N_1$ and node $N_3$ are set in the map information corresponding to the actual road contour R. Because of, for example, a limitation in the capacity of the storage media, even though node $N_2$, shown by broken lines, is at a curve in the road, node $N_2$ is not included in the map information. This being the case, the links $L_1$ and $L_2$, which are also shown by broken lines, are similarly not included in the map information, and the resulting map information reflects the nodes $N_1$ and $N_3$ as being connected by the link $L_3$. Thus, according to this map information the road contour is perceived and displayed as running along the link $L_3$.

If map matching is performed using such map information as a benchmark, even if the position of the mobile object detected and estimated by GPS or the inertial navigation sensor devices is $P_1$ or $P_2$ which is the actual position on the road, as shown in FIG. 1B, map matching results in the erroneous correction of the mobile object position to the position V on the link $L_3$.

Various methods have been proposed for improving the accuracy of map matching. However, in map matching, which has as its characteristic object to correct as noted above, the detected and estimated position of the mobile object to a point on a link that is included in the map information used, regardless of the details of the specific method used, there is an intrinsic limitation of the accuracy of position finding to the accuracy of the map information as an asymptote.

Even if the detected and estimated position of the mobile object is corrected so that there is an apparent solution to the display problem in the navigation system, there are still various problems if the mobile object position accuracy is poor.

For example, in a so-called navigation-coordinated system for driving support (for example, in stopping assistance control by an alarm or by braking intervention at an intersection), a high-accuracy GPS apparatus is mounted aboard a vehicle, and high-accuracy position detection is performed with an error not exceeding several centimeters. In this system, the detected vehicle position is used in various control applications and, even if the receiving condition of the GPS signal is not poor, it is necessary to continue to detect the position of the vehicle in order to continue vehicle control. In such cases, as described in JP 9-189564A, in a method for correcting the inertial navigation sensor devices and the outputs thereof using map information, deterioration of the detected and estimated position accuracy could be so serious as to make it difficult to continue control of the vehicle based on vehicle position.

SUMMARY OF THE INVENTION

The present invention is based on a concept that is fundamentally different from map matching, which merely adjusts the accuracy of detected and estimated position of a mobile object to the accuracy of the map information, and provides a mobile object position estimation apparatus that estimates the position of a mobile object with high accuracy, and without the influence of the road contour and the surrounding environment.

A first aspect of the present invention relates to a mobile object position estimation apparatus that is mounted aboard a mobile object and that estimates the position of the mobile object. The mobile object position estimation apparatus has a first estimation means for estimating the position of the mobile object based on the outputs from inertial navigation sensor devices (acceleration sensors, and yaw rate sensors or the like) mounted aboard the mobile object, a storage means for storing map information including at least node information, a second estimation means for estimating the position of the mobile object based on the predicted travel path of the mobile object predicted from the node information, and a synthesis means for determining the final estimated position of the mobile object by synthesizing the mobile object position estimated by the first estimation means and the mobile object position estimated by the second estimation means.

Each time the final estimated position of the mobile object is determined by the synthesis processing means noted above, the first estimation means uses the newest final estimated position as a new starting point for estimating the position of the mobile object position based on the output from the inertial navigation sensor devices.

This aspect is based on the following three observations. Specifically, (a) the observation that, with regard to the node information and link information included in the road information, although the accuracy of the link information is relatively poor due to node "skipping", the node information itself has relatively good accuracy; and (b) with regard to the outputs from the inertial navigation sensor devices, (b-i) although errors accumulate with the passage of time so that a large offset with respect to the actual values arises, the error is relatively small when minimal time has elapsed from when a starting point is used as a benchmark, and (b-ii) it is possible to estimate the instantaneous direction of travel of the mobile object at each individual instant with relatively good accuracy.

That is, even if the actual contour of the road between neighboring nodes is not a straight line as indicated by the link information, the synthesis means takes into consideration the mobile object position estimated from the outputs from the inertial navigation sensor devices, to determine the final estimated position of the mobile object, having estimated the contour of the actual road between nodes from the mobile object position direction of travel estimated from the outputs from the inertial navigation sensor devices.

In this aspect, in the estimation of the position of the mobile object, the concept, such as in map matching, for any case of estimated mobile object position, of moving the position of the mobile object over some link that is included in the road information is eliminated, and an overall judgment is made with regard to the mobile object position estimated from the road information and the mobile object position estimated from the outputs from the inertial navigation sensor devices. Therefore, because it is possible to combine elements of the two methods having relatively good accuracy, that is, because it is possible to achieve a mobile object position estimation based on the node information included in the road information and based on the mobile object direction of travel estimated from the outputs from the inertial navigation sensor devices, it is possible to estimate the position of the mobile object with much greater accuracy than the map matching method.

Because the absolute position of the mobile object may be detected with very little error using a high-accuracy GPS, when the mobile object position estimation apparatus further has a position detection means that uses communication (for example, a high-accuracy GPS) to detect the absolute coordinates of the mobile object, a setting may be made so that the first estimation means, the second estimation means, and the synthesis means operate only when the position detection means is unable to communicate (that is, for example, when the GPS signal receiving condition is poor).

In this case, the second estimation means takes the estimated road contour either to be a straight line or to be a curved line based on a prescribed interpolation method (for example, colothoid interpolation or spline interpolation or the like) to connect nodes in the node information in the vicinity of the mobile object. The amount of offset in the road widthwise direction between the estimated road contour line and the position of the mobile object detected by the position detection means is determined and a line that is the estimated road contour line shifted by this amount of offset is taken as the predicted travel path. A distance detection means detects the distance that the mobile object moves after the final mobile object position is estimated and the position that is moved along the predicted travel path by the amount of detected movement can be estimated as the new mobile object position. Alternatively, the point of intersection of a vertical line extended to the predicted travel path from the mobile object position estimated by the first estimation means with the predicted travel path can be estimated as the mobile object position.

Another aspect of the present invention relates to a method for estimating the position of the mobile object. The method estimates the position of the mobile object based on the outputs from inertial navigation sensor devices and estimates the position of the mobile object based on the predicted path of traveling of the mobile object as predicted from node information included in map information stored in a storage means. The method for estimating the position of the mobile object determines the final estimated position of the mobile object by synthesizing the mobile object position estimated based on the outputs from the inertial navigation sensor devices and the mobile object position estimated based on the predicted travel path.

According to an aspect of the present invention a mobile object position estimation apparatus is provided that estimates the position of a mobile object with high accuracy, free from the influence of the road contour and the surrounding environment.

BRIEF DESCRIPTIONS OF THE DRAWINGS

The foregoing and further objects, features, and advantages of the invention will become apparent from the following description of the embodiments with reference to the accompanying drawings, wherein like numerals are used to represent like elements and wherein.

DETAILED DESCRIPTION OF THE PREFERRED EMBODIMENTS

Embodiments of the present invention are described, with references made to the accompanying drawings. Because the basic concept, the main hardware, the basic control method and the tike of using GPS, and estimating a position based on a position estimation apparatus and the outputs from an inertial navigation sensor devices are conventionally known, they are not described in detail herein.

A mobile object position estimation apparatus according to an embodiment of the present invention is described below, using FIG. 2 through FIG. 6. In the described embodiment, the mobile object is a vehicle.

Figure 2:
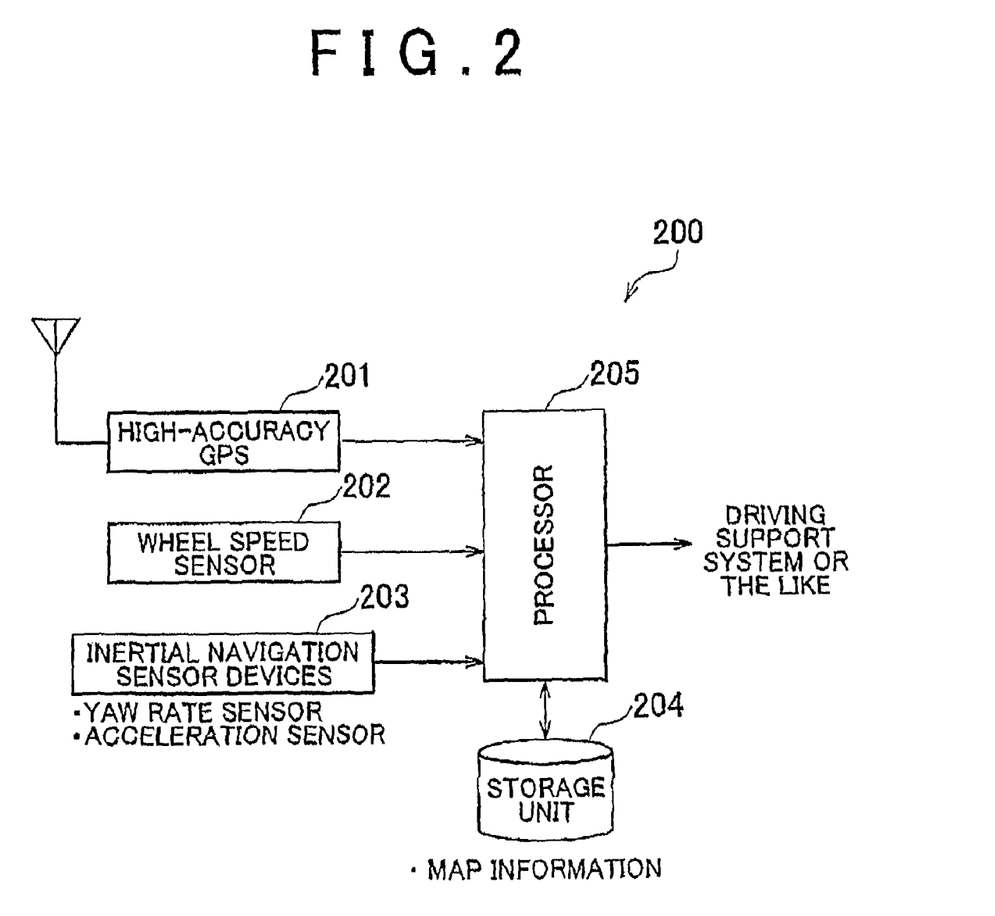
FIG. 2 is a simplified configuration drawing showing a mobile object position estimation apparatus according to an embodiment of the present invention.

FIG. 2 is a simplified configuration drawing showing a mobile object position estimation apparatus 200 according to the described embodiment mounted aboard a vehicle.

The mobile object position estimation apparatus 200 has, for example, a high-accuracy GPS apparatus 201, which is an RTK-GPS or the like, as means for detecting the absolute coordinates of the current position of the vehicle.

The mobile object position estimation apparatus 200 also has a wheel speed sensor 202 as means for detecting the speed of the vehicle.

The mobile object position estimation apparatus 200 further has inertial navigation sensor devices 203. The inertial navigation sensor devices 203 in this embodiment may include, for example, a yaw rate sensor; and acceleration sensors (front/rear, left/right, up/down).

The mobile object position estimation apparatus 200 also has a storage unit 204 into which map information is preloaded. The storage unit 204 in this embodiment may be any appropriate type of storage medium. The map information stored in the storage unit 204 may be appropriately updated, for example by communication, so that it is the data is current.

The mobile object position estimation apparatus 200 also has a processor 205 that calculates and estimates the position and orientation of the vehicle with high accuracy. The processor 205 includes, for example, a microprocessor.

In the embodiment, the processor 205 calculates or estimates the position and orientation of the vehicle with high accuracy, and provides the results of doing so, for example, to a driving support system that utilizes the current vehicle position information. The mobile object position estimation apparatus 200 itself may be part of a navigation system.

Figure 3:
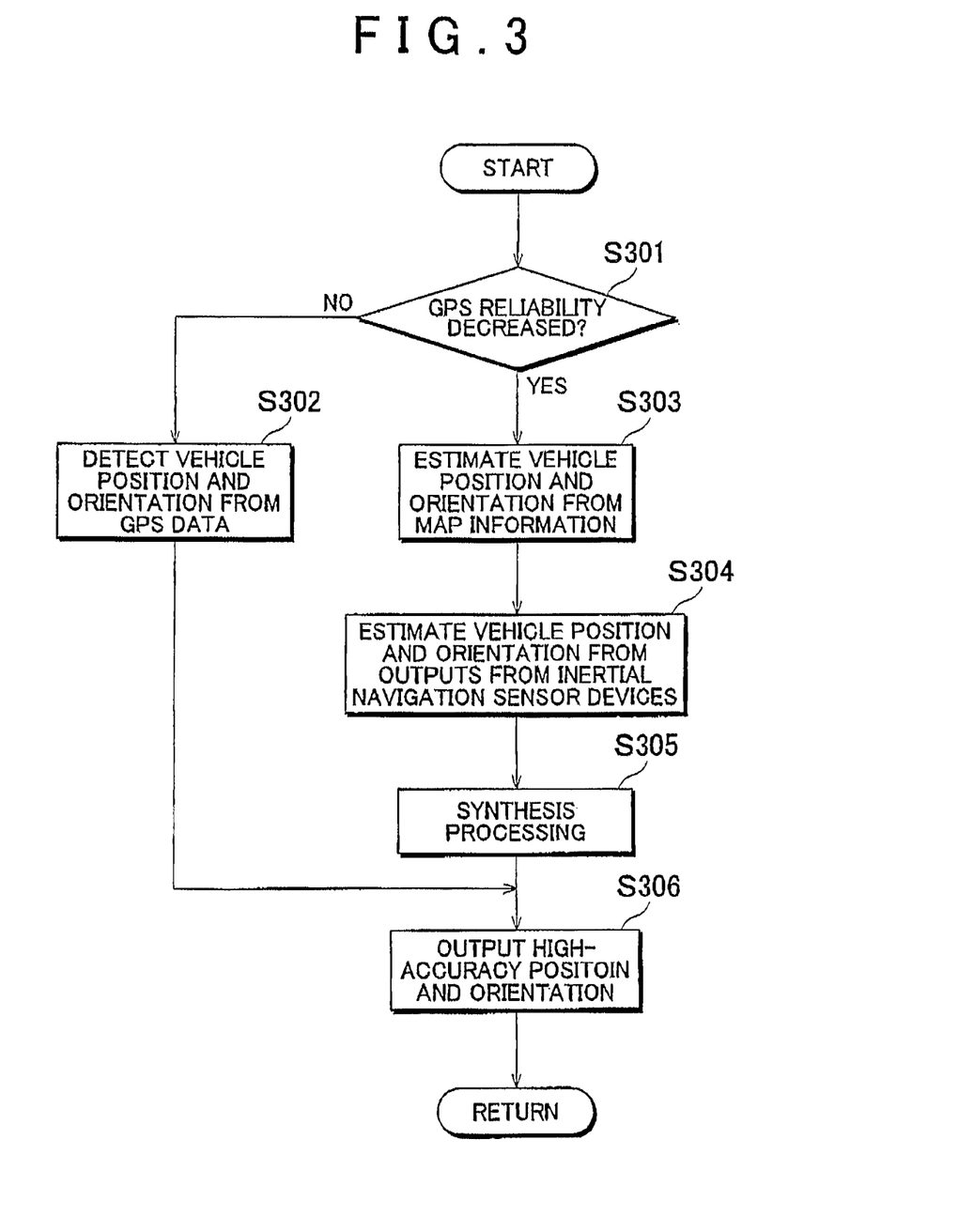
FIG. 3 is a flowchart showing the flow of position and orientation estimation processing performed by a mobile object position estimation apparatus according to an embodiment of the present invention.

Referring to the flowchart of FIG. 3, the process of estimating the orientation and position of the vehicle in the mobile object position estimation apparatus 200 is described below.

First, the high-accuracy GPS apparatus 201 determines whether the GPS data is sufficiently reliable (S301). The determination is based on such factors as, for example, the strength of the GPS signals received and the number of GPS satellites from which reception is possible.

If the radio signal environment is good, for example, the GPS apparatus 201 determines that the GPS data is sufficiently reliable (NO at S301). If this is the case, the processor 205 can detect the position of the vehicle using absolute coordinates of the current position of the vehicle detected by the high-accuracy GPS 201, and can also calculate the orientation (direction of movement) of the vehicle by monitoring the time changes of these absolute coordinates (S302). The detected and calculated position and orientation of the vehicle are provided, as noted above, to a driving support system or the like (S306).

If, however, the radio signal environment is poor, GPS apparatus 201 determines that the GPS data is not sufficiently reliable (YES at S301), the processor 205, although it cannot use GPS, uses the inertial navigation sensor devices 203 to estimate the vehicle position and orientation with high accuracy at the subsequent steps S303 to S305.

Specifically, the processor 205 estimates the final position and orientation of the vehicle by making an overall consideration of both the vehicle position and orientation estimated from the map information stored in the storage unit 204, and the vehicle position and orientation estimated from the outputs from the inertial navigation sensor devices 203.

The processor 205 first estimates the position and orientation of the vehicle based on the map information stored in the storage unit 204 (S303). Details of the estimation processing performed at step S303 are described below, following the flowchart of FIG. 4 while referring to FIG. 5.

Figure 4:
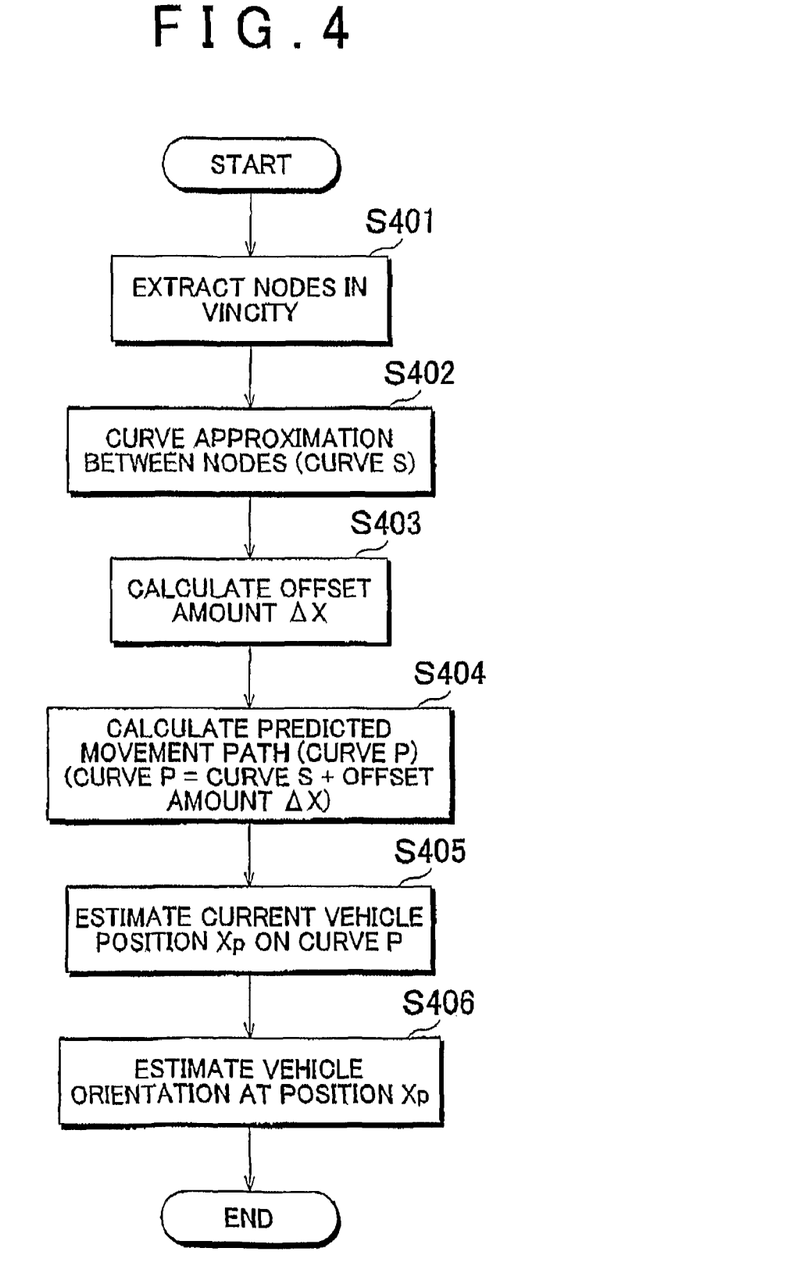
FIG. 4 is a flowchart showing the flow of position and orientation estimation based on map information performed by a mobile object position estimation apparatus according to an embodiment of the present invention.
Figure 5:
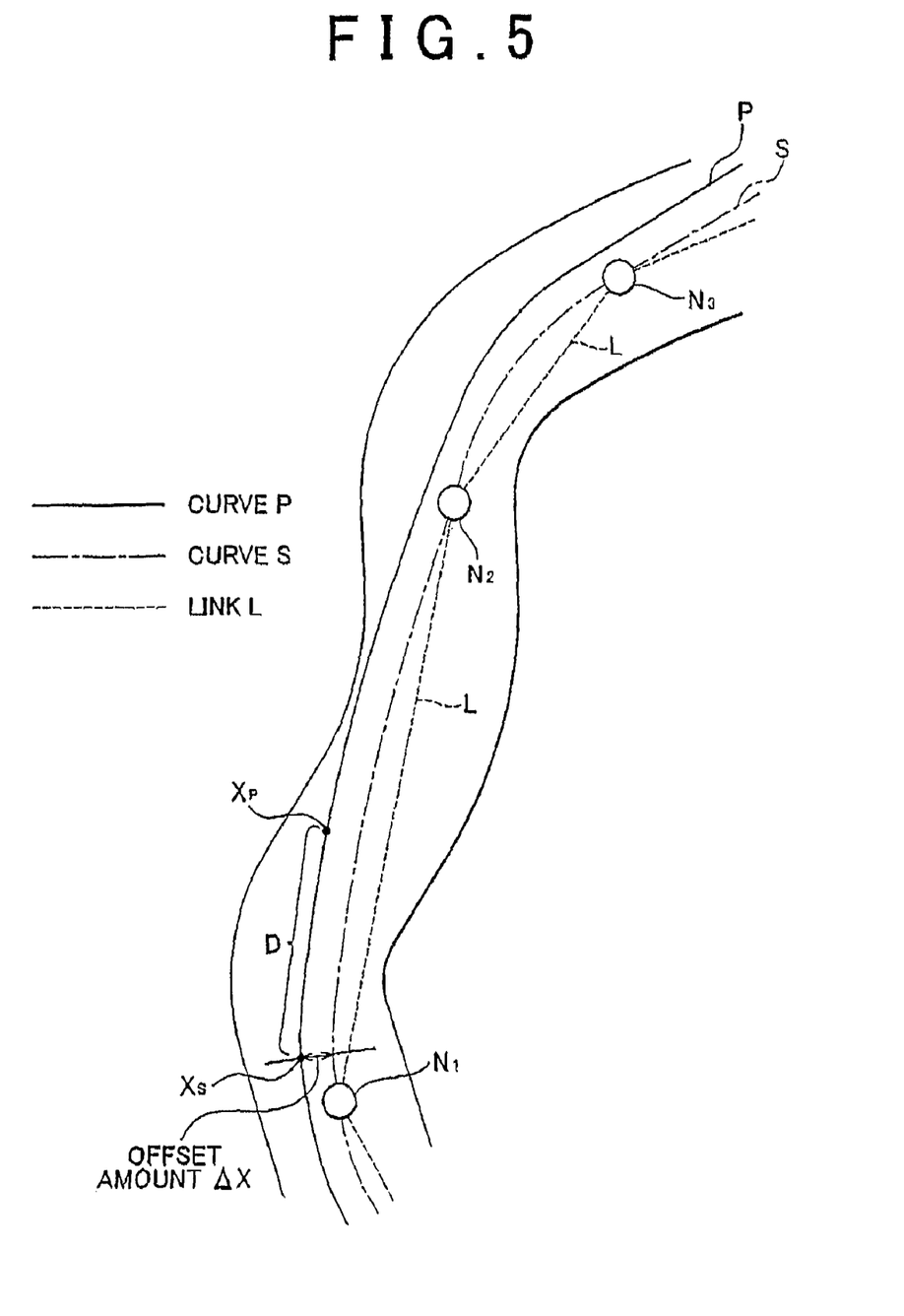
FIG. 5 is a drawing for explaining the position and orientation estimation processing based on map information by a mobile object position estimation apparatus according to an embodiment of the present invention.

When the high-accuracy GPS apparatus 201 determines whether reliability of GPS data has decreased, the processor 205 extracts node positions N and link positions L in the vicinity of the vehicle position Xs which is last acquired from GPS data, by comparing with map information stored in the storage unit 204 (S401).

The processor 205 then determines from the vehicle position $X_S$ last acquired from GPS data which link position L the vehicle is positioned on, and on the link L, prescribed numbers of nodes $N_1$ to $N_3$ existing before and after the vehicle position $X_S$ last acquired by GPS data are connected by a smooth approximated curve obtained using, for example, clothoid interpolation or spline interpolation, this approximated curve being the road contour curve S (S402).

Next, the processor 205 calculates the amount of offset ΔX, in the road widthwise direction, of the vehicle position $X_S$ last acquired by GPS data from the road contour curve S predicted by approximation from the node information N (S403). The offset amount ΔX is a parameter that can take either a positive or a negative value. Either the left direction or the right direction in the road widthwise direction is pre-established as the positive direction of the offset ΔX.

The processor 205 next calculates and obtains, as a predicted travel path the curve P by offsetting (parallel translation) the estimated road contour curve S by the offset amount ΔX (S404).

Next, the processor 205, based on the time that has elapsed from the point at which the vehicle position $X_S$ was last acquired from GPS data and the output of the wheel speed sensor 202, calculates the travel distance D of the vehicle from the position $X_S$, and, under the assumption that the vehicle has moved along the predicted travel path P, determines the current position $X_P$ on the predicted travel path P (S405).

The processor 205 further estimates the inclination of the predicted travel path P at the position $X_P$ as the orientation (yaw and pitch) of the vehicle (S406).

Using the node positions N of the map information and the vehicle position $X_S$ last detected by the GPS, that are thought to have relatively good accuracy, as a benchmark, the position $X_P$ and the orientation are estimated for the case in which the vehicle travels along the estimated road contour curve S as it maintains its relative positional relationship of the position $X_S$ with respect to the road contour curve S estimated from only the node information.

Returning to FIG. 3, when the vehicle position and orientation are estimated from the map information in this manner (S303), the processor 205 then estimates the position and orientation of the vehicle, based on the outputs from the inertial navigation sensor devices, in the same manner as a conventional manner (S304).

Although the description and the drawings are for the case in which the estimation processing based on the map information is performed first, followed by the estimation processing based on the outputs from the inertial navigation sensor devices, these two processing functions can be executed in the reverse sequence or executed simultaneously in parallel.

After the position and orientation of the vehicle are estimated in this manner based on map information and the position and orientation of the vehicle are estimated as well based on the outputs from the inertial navigation sensor devices, the processor 205 next sets the final estimated position of the vehicle by performing a synthesis using, for example, a Kalman filter or the maximum likelihood estimation, so that the estimation results reflect both of these estimations (S305).

Figure 6:
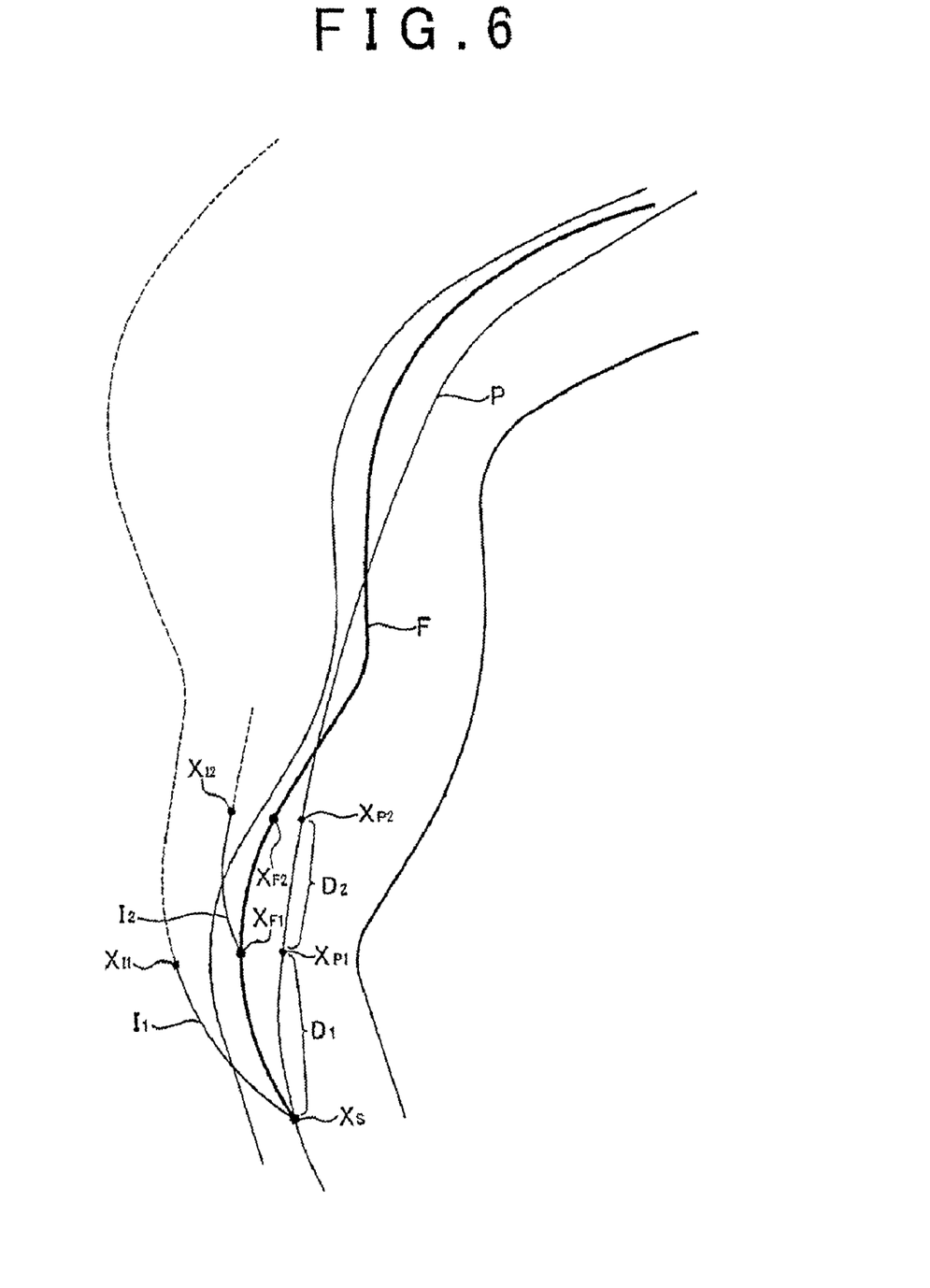
FIG. 6 is a drawing for explaining synthesizing performed by a mobile object position estimation apparatus according to an embodiment of the present invention.

The synthesis processing is described now with reference to FIG. 6. The synthesis processing in this embodiment, based on the observation that the position accuracy of the node information part of the map information is relatively good, takes into consideration the vehicle position $X_P$ estimated using node information as a benchmark, to improve the accuracy of the relative positional relationship of the final estimated vehicle position to the nodes.

Although the accuracy of the outputs from the inertial navigation sensor devices worsens as errors accumulate with the passage of time from when the starting point used as a benchmark, the vehicle direction of movement is detected for each instant with relatively good accuracy. Based on this observation, by taking the vehicle position $X_I$ estimated based on the outputs from the inertial navigation sensor devices into consideration when estimating the vehicle position, even in a region in which a node is not set in the map information, the actual road contour estimated by the direction of movement of the vehicle is reflected, thereby improving the position accuracy of the final estimated vehicle position with respect to the actual road contour.

In FIG. 6, there is a decrease in the GPS reliability at the position $X_S$. The position $X_{P1}$ indicates the vehicle position estimated based on the node information and the travel distance $D_1$ from the position $X_S$ as described above. The position $X_{I1}$ indicates the vehicle position estimated using only the outputs from the inertial navigation sensor devices with $X_S$ as the starting point, instead of using GPS. As already described, an estimation based on the outputs from the inertial navigation sensor devices, as shown by the broken line in FIG. 6, deviates from the actual road position as errors accumulate, and the error increases as the distance from the starting point $X_S$ increases.

In this embodiment, the synthesis processing is performed so that the good accuracy of both the estimated position $X_{P1}$, which has relatively good accuracy regarding the relative position to the actual node position, and the estimated position $X_{I1}$ that reflects the road contour, such as a curvature, with relatively good accuracy are reflected, so as to determine the final estimate vehicle position $X_{F1}$.

Similar to the above-noted position estimation, the final estimated orientation of the vehicle is obtained by synthesis processing to utilize the advantages for estimation of both the orientation estimated based on the map information and the orientation based on the outputs from the inertial navigation sensor devices.

Returning to FIG. 3, when the final vehicle position and orientation are estimated, the processor 205 may provide the results to, for example, a driving support system or the like (S306).

The steps S303 to S305 are repeated until the reliability of the GPS is restored. Referring again to FIG. 6, after determining the final estimated vehicle position $X_{F1}$, when determining the next final vehicle position $X_{F2}$, the previously determined position $X_{F1}$ is used as the new starting point in the estimation based on the outputs from the inertial navigation sensor devises. That is, the distance $D_2$ from the position $X_{F1}$ is used in the estimation of the estimated position $X_{P2}$ based on map information. By using the position $X_{F1}$ as the new starting point in the estimation of the estimated position $X_{I2}$ based on the outputs from the inertial navigation sensor devices, the accumulated error included in the position $X_{I2}$ is kept to a minimum.

Thus, this embodiment considers both the vehicle position and orientation estimated based on the node information and the vehicle position and orientation estimated based on the outputs from the inertial navigation sensor devices, thereby enabling determination of the vehicle position and orientation with good accuracy relative to both node positions and the road contour.

Although the foregoing embodiment is presented with the combination of a yaw rate sensor and acceleration sensors as the inertial navigation sensor devices, the present invention is not restricted in this respect, and can have a combination, for example, of a wheel speed sensor and a steering angle sensor.

Also, although the foregoing embodiment describes the estimation of the vehicle position based on map information in which the curve S is smoothed by interpolation processing to connect nodes in the vicinity of the vehicle and the predicted travel path P is taken as a curve obtained by offsetting this curve, it will be understood that it is also possible to use link information included in the map information in place of the curve S thereby simplifying the processing by eliminating the interpolation processing step.

In the described embodiment, when the vehicle position is estimated based on map information, the estimated position $X_P$ is obtained by moving along the predicted travel path P by the travel distance D calculated based on the output of the wheel speed sensor 202. However, the present invention is not restricted in this manner. For example, the point of intersection of a vertical line extended to the predicted travel path P from the position $X_I$ estimated based on the outputs from the inertial navigation sensor devices with the predicted travel path P may be taken as the estimated position $X_P$ based on the map information. In this case, the wheel speed sensor becomes unnecessary.

While the invention has been described with reference to what are considered to be preferred embodiments thereof, it is to be understood that the invention is not limited to the disclosed embodiments or constructions. On the contrary, the invention is intended to cover various modification and equivalent arrangements. In addition, while the various elements of the disclosed invention are shown in various combinations and configurations, which are exemplary, other combinations and configurations, including more, fewer, or only a single element, are also within the spirit and scope of the invention.

The present invention can be used, for example, in a mobile object position estimation apparatus mounted aboard a mobile object, such as a vehicle, that estimates the position of the mobile object. In the case of mounting aboard a vehicle, the mobile object position estimation apparatus according to the present invention is preferably configured as a part of a navigation system, in which case there is no restriction with regard to the outer appearance, weight, size, and running performance of the vehicle on board which the mobile object position estimation apparatus is mounted.

The invention claimed is:

1. A mobile object position estimation apparatus, comprising:
   a position detection device that detects absolute coordinates of a mobile object position using communication;
   a first estimation device that estimates the mobile object position based on output from inertial navigation sensor devices mounted on a mobile object;
   a storage device that stores map information including at least node information;
   a second estimation device that estimates the mobile object position based on a predicted travel path of the mobile object as predicted from the node information, the predicted travel path being a line that is an estimated road contour line shifted by an offset, the estimated road contour line being a line connecting nodes of the node information in a vicinity of the mobile object, and the offset being determined by the second estimation device in a road widthwise direction between the estimated road contour line and the mobile object position detected by the position detection device; and
   a synthesizing device that determines a final estimated mobile object position by synthesizing the mobile object position estimated by the first estimation device and the mobile object position estimated by the second estimation device.

2. The mobile object position estimation apparatus according to claim 1, wherein when the final estimated mobile object position is determined by the synthesizing device, the first estimation device uses a preceding final estimated position as a new starting point for estimating the mobile object position based on the output from the inertial navigation sensor devices.

3. The mobile object position estimation apparatus according to claim 1, wherein the inertial navigation sensor devices include an acceleration sensor and a yaw rate sensor.

4. The mobile object position estimation apparatus according to claim 1, wherein the inertial navigation sensor devices include a wheel speed sensor and a steering angle sensor.

5. The mobile object position estimation apparatus according to claim 1, wherein the first estimation device, the second estimation device, and the synthesizing device operate when the position detection device fails to perform the communication.

6. The mobile object position estimation apparatus according to claim 1, wherein the first estimation device, the second estimation device, and the synthesizing device operate when the position detection device determines that reliability of data detected from the position detection device decreases.

7. The mobile object position estimation apparatus according to claim 1, wherein the second estimation device adopts the estimated road contour line to be a curve based on a prescribed interpolation method connecting nodes in the vicinity.

8. The mobile object position estimation apparatus according to claim 7, wherein the prescribed interpolation method is a clothoid interpolation method.

9. The mobile object position estimation apparatus according to claim 7, wherein the prescribed interpolation method is a spline interpolation method.

10. The mobile object position estimation apparatus according to claim 1, wherein the second estimation device includes a distance detection device that detects a travel distance of the mobile object, and adopts, as a new mobile object position, a position that is moved along the predicted travel path by an amount of traveling detected by the distance detection device from a time when the second estimation device previously estimated the mobile object position.

11. The mobile object position estimation apparatus according to claim 10, wherein the distance detection device includes a wheel speed sensor, and
    wherein the travel distance is calculated based on an amount of time elapsed from a previous prediction of the estimated mobile object position and output from the wheel speed sensor.

12. The mobile object position estimation apparatus according to claim 1, wherein the second estimation device adopts, as a final mobile object position, a point of intersection of a vertical line extended to the predicted travel path from the estimated mobile object position estimated by the first estimation device with the predicted travel path.

13. A method for estimating a position of a mobile object, comprising:
    detecting absolute coordinates of a mobile object position using a communication device;
    estimating of the mobile object position based on outputs from inertial navigation sensor devices;
    setting a predicted travel path of the mobile object based on node information included in map information, the setting including determining the predicted travel path as a line that is an estimated road contour line shifted by an offset, the estimated road contour line being a line connecting nodes of the node information in a vicinity of the mobile object, and the offset being determined in a road widthwise direction between the estimated road contour line and the mobile object position detected by the detecting step;
    estimating the mobile object position based on the predicted travel path; and
    determining a final estimated mobile object position by synthesizing the mobile object position estimated based on the outputs from the inertial navigation sensor devices and the mobile object position estimated based on the predicted travel path.

* * * * *